Nov. 12, 1935.    J. F. McGINNESS    2,021,075
COMBINATION TRAILER FOR HIGHWAYS AND RAILROADS
Filed Oct. 11, 1934    2 Sheets-Sheet 1

WITNESSES

INVENTOR
James F. McGinness
BY
ATTORNEYS

Nov. 12, 1935.  J. F. McGINNESS  2,021,075
COMBINATION TRAILER FOR HIGHWAYS AND RAILROADS
Filed Oct. 11, 1934  2 Sheets-Sheet 2

WITNESSES
Geo. W. Naylor
A. L. Kitchin.

INVENTOR
James F. McGinness
BY
Munn, Anderson & Liddy
ATTORNEYS

Patented Nov. 12, 1935

2,021,075

UNITED STATES PATENT OFFICE 2,021,075

COMBINATION TRAILER FOR HIGHWAYS AND RAILROADS

James F. McGinness, Spring Valley, N. Y.

Application October 11, 1934, Serial No. 747,940

3 Claims. (Cl. 105—215)

This invention relates to an improved combination trailer adapted to be adjusted to operate on highways or on railroads, an object being to provide a construction wherein the body of the trailer permits the same to function in the usual manner for receiving goods to be transported, while a supporting running gear structure is formed so that the trailer may be pulled over a highway by a tractor or may be drawn over a railroad when connected to an engine.

Another object of the invention is to provide a trailer wherein flanged wheels are provided capable of fitting the tracks of a railroad and in addition the traction wheels at the rear of the trailer are adapted to operate on an ordinary roadway, the various wheels and associated parts being mounted so that the flanged wheels may be raised and lowered in respect to the traction wheels over the roadway.

A further object more specifically is to provide a trailer which is adapted to be connected with a tractor or to be connected as part of a railroad train, the construction being such that a pair of traction wheels are arranged at one end of the trailer, capable of operating on ordinary highways and, in addition, flanged wheels formed to fit the rails of a railroad are arranged in groups at the front and rear of the trailer, the same being provided with means for raising and lowering the respective wheels so that when the trailer is used on a railroad the flanged wheels are lowered and the traction wheels raised, and when used on a highway the flanged wheels are raised and the traction wheels are lowered.

In the accompanying drawings—

Figure 1:
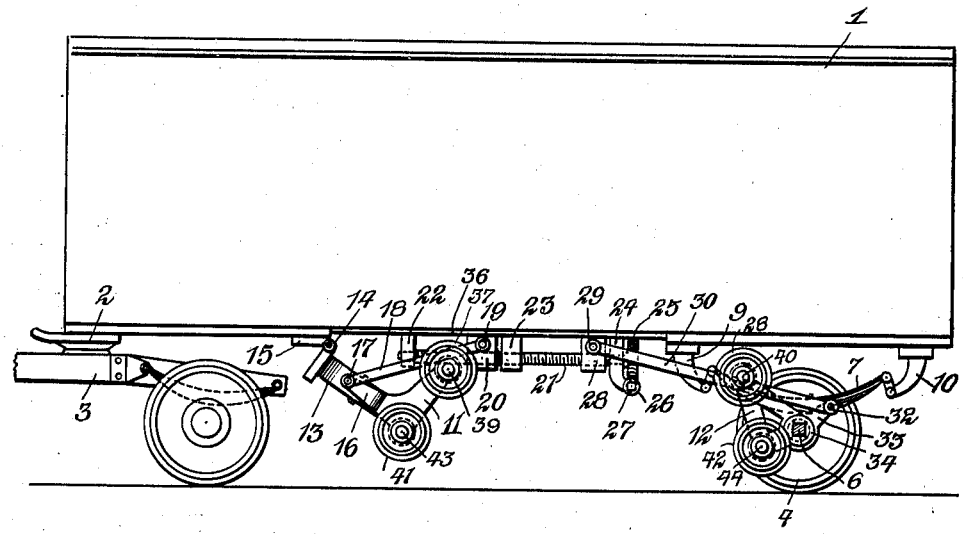
Figure 1 is a side view of a trailer disclosing an embodiment of the invention, the same being shown in connection with part of a tractor and ready to be pulled over a roadway.

Referring to the accompanying drawings by numerals, 1 indicates a trailer body and 2 a fifth wheel of any desired structure for receiving a tractor 3, which also may be of any desired type. When the tractor 3 is placed in position, it is adapted to support the front part of the trailer body 1 as well as propel the trailer along. Near the rear of the body 1 there is provided a pair of rear traction wheels 4 and 5, which may be provided with rubber tires and which rest on the roadway when the parts are in the position shown in Fig. 1. The wheels are mounted on a rear shaft 6 which is supported by suitable springs 7 and 8, and these springs are connected by suitable brackets, shackles or the like 9 and 10, with the bottom of the body 1. When the trailer is being loaded, it is easily backed into position and then the tractor 3 taken away and used at some other point.

Figure 4:
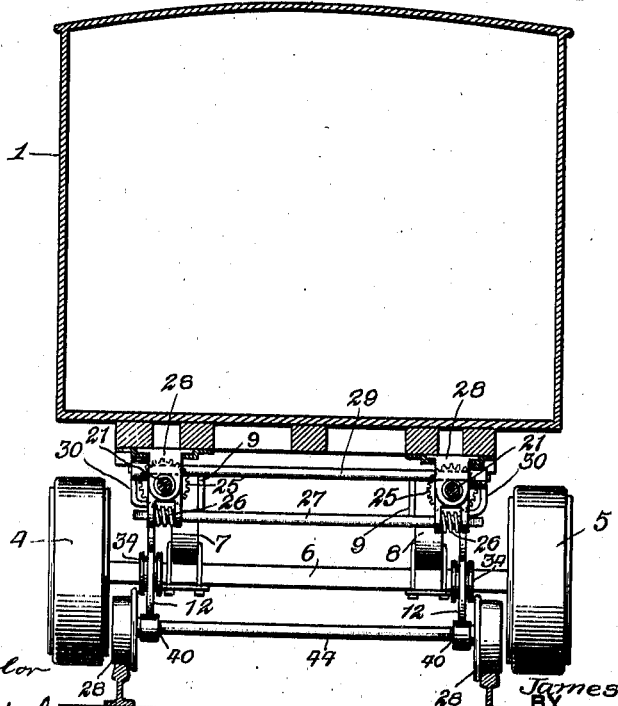
Fig. 4 is a transverse sectional view through Fig. 2, on line 4—4, the same being on an enlarged scale.

In order to support the front part of the trailer it has been customary to provide a pair of small wheels which rest on the ground after the tractor has been removed. However, in the present instance a special arrangement is provided which secures this result and also additional results. As shown in the drawings, there is provided a truck 11 at the front and a truck 12 at the rear, the truck 11 having an upstanding standard 13 which is hinged at 14 to a suitable plate 15, which plate is rigidly secured in any desired manner to the body 1. In addition, there is provided an arm 16 rigidly secured to the truck 11 and provided with a pivotal pin 17, which also extends through the end of a link 18, which link is then pivotally connected at 19 to a traveling nut 20. The traveling nut 20 is mounted on a threaded rod 21, which is connected with the trailer body 1 by suitable spurs 22, 23 and 24. It will be understood that the rod 21 is mounted in these spurs to freely rotate but not to move longitudinally. This result is secured by having the ends of the rod 21 reduced where it extends through the spurs 22 and 24. A worm gear 25 is rigidly secured to the threaded rod 21 at one end and continually meshes with a worm 26 which has a squared shaft 27 extending therefrom. Whenever desired, a crank having a square hole may be slipped over the end of the shaft 27 and the shaft rotated. This will rotate the threaded rod 21 and cause the traveling nut 20 to move over to the right or left when viewed from the side. A second traveling nut 28 is carried by the threaded rod 21 and moves simultaneously with the nut 20, said second nut being connected by a suitable pivotal pin 29 with a push-and-pull rod 30, which push-and-pull rod is pivotally connected at 32 to an extension 33 of the truck 12. It will be understood that the truck 12 is rotatably mounted on grooved spools 34, which spools have square apertures for accommodating the shaft 6, but on the periphery are provided circular grooves for fitting circular parts of the truck 12, as shown in Figs. 1 and 4.

Figure 2:
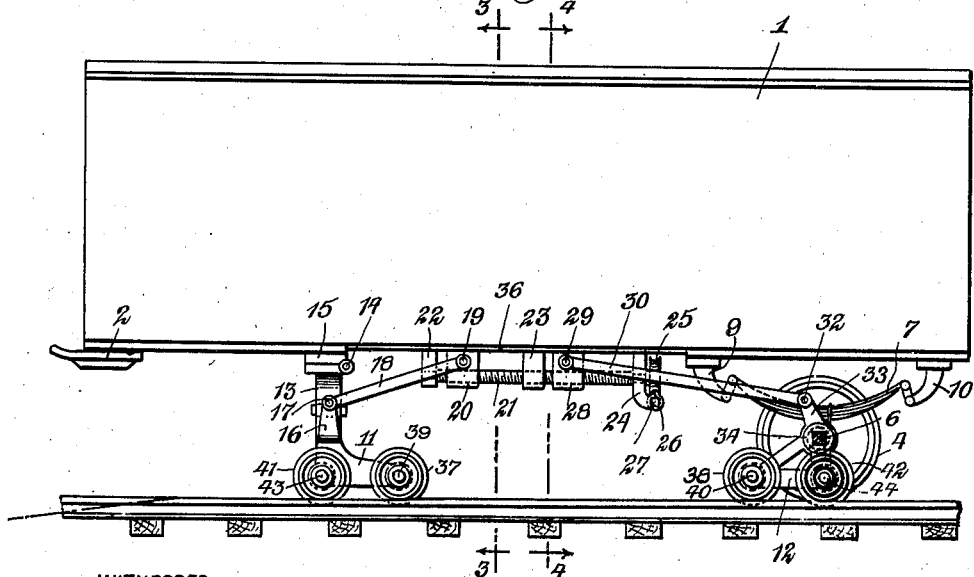
Fig. 2 is a view similar to Fig. 1 but showing the parts positioned to be drawn over a pair of rails.

By reason of this arrangement, when the parts are in the position shown in Fig. 1 and it is desired to lower the trucks, the shaft 27 is rotated in the desired direction and the nuts 20 and 28 are moved to the left, as shown in said figure, until the parts assume the position shown in Fig. 2. The parts may be moved to the position shown in Fig. 2 while the tractor is in the position illustrated in Fig. 1, and when this takes place the body 1 and associated parts are all supported by the trucks and the tractor 3 may be moved away to a second point. Also when the parts have been moved to their lower position, as shown in Fig. 2, the trailer may be pulled on to a railroad track and connected to a train so as to act as one of the cars of the train.

It will be noted that each truck 11 and 12, on each side, is provided with a pair of wheels, said wheel being connected by suitable shafts, and these shafts are sufficiently proportioned and connected to the other parts to permit a longitudinal movement, whereby each pair of wheels may shift back and forth as desired when moving around a curve. As the trucks 11 and 12 move downwardly, the body 1 is raised slightly so that the traction wheels 4 and 5 will be off the ground a short distance, whereby all of the load will be carried by the trucks and the flanged wheels forming a part thereof. When the device is pulled onto the rails of a railroad track, as shown in Figs. 3 and 4, the traction wheels 4 and 5 are supported so that their lowermost point will be about on a level with the top of the rails.

Figure 3:
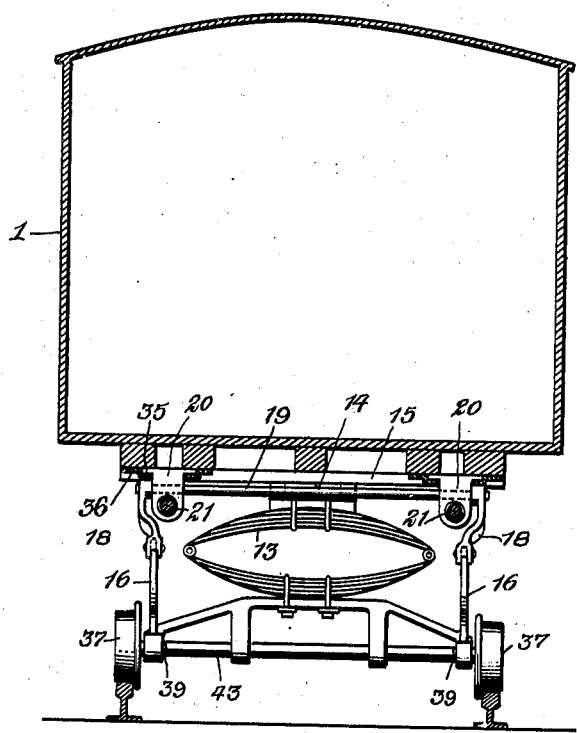
Fig. 3 is a transverse sectional view through Fig. 2, on the line 3—3, the same being on an enlarged scale.

It will be noted from Fig. 3 that the traveling nut structure 20 is duplicated, there being one nut structure on each side of the trailer, and the respective nuts provided with flanges 35 slidably arranged in slideways 36 secured to the bottom of the body 1. The pin 19 extends through both of the traveling nuts so that they will act in unison. The same arrangement is provided in connection with the nut 28, so that when the shaft 27 is rotated power will be transmitted to both sides of the construction simultaneously, there being naturally duplicate worms 26 and duplicate worm wheels 25.

It will be understood that the trailer is not to be moved when the trucks 11 and 12 are in their lowermost position unless they are on rails as illustrated in Fig. 2, though these members will act as supports when the tractor 3 is removed, thus holding the trailer body 1 in the proper horizontal position ready to be unloaded or loaded, and also ready to receive the tractor 3 whenever desired.

In regard to the trucks 11 and 12, it will be noted that the wheels 37 and 38 are journaled on stub shafts 39 and 40, while the wheels 41 and 42 are connected to shafts 43 and 44, which extend from one side of the trucks to the other. This arrangement is desirable so that the trucks may be swung upwardly to the position shown in Fig. 1 without having any of the axles of the trucks strike the rods 21 or either of the links 30.

I claim:

1. A support for a trailer, comprising a pair of spaced trucks, each truck having an L-shaped body, two pairs of flanged wheels carried by one leg of the L-shaped body, means for hinging the other leg of the L-shaped body to said trailer, a projection rigidly connected with said other leg, a link pivotally connected with each of said projections, a traveling nut structure pivotally connected with said links at the end opposite that connected with said projection, and means for causing said traveling nut structures to function so as to move said links and to raise and lower said trucks.

2. A wheeled support for a trailer, comprising a pair of spaced swinging trucks, means for pivotally connecting said trucks to said trailer, a pair of links connected with each truck, a traveling nut connected with each of said links, a pair of threaded rods, each of said threaded rods extending through two of said nuts, and hand-operated means for rotating said threaded rods simultaneously whereby said nuts may move back and forth simultaneously and swing said trucks from functioning to non-functioning position, and the reverse.

3. A trailer, comprising a body, a pair of traction wheels adjacent the rear of the body, means including an axle mounting the rear part of said body on said traction wheels, an L-shaped truck frame adjacent each of said traction wheels, each of said truck frames having one arm pivotally mounted on said axle and a pair of flanged wheels spaced apart and mounted on the other arm, means presenting an extension on each of said truck frames, said extensions projecting from the respective arms pivotally connected with said axle, a link for each frame pivotally connected at one end to the outer end of the respective extensions, a traveling nut pivotally connected with each of said links, a threaded rod acting on each of said nuts to cause the nuts to function and move said link and swinging upwardly and downwardly said truck frames, a second pair of L-shaped truck frames adjacent the front of said body, means for hingedly connecting one arm of each of said second truck frames to said body, a pair of spaced flanged wheels carried by the other arm of each of said second truck frames, a second traveling nut on each of said rods and a link for each of said second traveling nuts, said last-mentioned links being pivotally connected to the first-mentioned arm of said second truck frames whereby as said threaded rods are rotated said second truck frames will swing simultaneously upwardly and downwardly according to the rotation of said rods, and hand-actuated means for rotating both of said threaded rods simultaneously.

JAMES F. McGINNESS.